United States Patent
Ravi et al.

(10) Patent No.: US 9,796,905 B2
(45) Date of Patent: Oct. 24, 2017

(54) METHODS AND COMPOSITIONS FOR TREATING A SUBTERRANEAN FORMATION WITH SALT-TOLERANT CEMENT SLURRIES

(71) Applicant: Halliburton Energy Services, Inc., Houston, TX (US)

(72) Inventors: Krishna M. Ravi, Houston, TX (US); Rahul Chandrakant Patil, Pune (IN); Sandip Prabhakar Patil, Pune (IN); Sohini Bose, Pune (IN); Abhimanyu Deshpande, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 595 days.

(21) Appl. No.: 14/359,476

(22) PCT Filed: Sep. 20, 2013

(86) PCT No.: PCT/US2013/060843
§ 371 (c)(1),
(2) Date: May 20, 2014

(87) PCT Pub. No.: WO2014/052182
PCT Pub. Date: Apr. 3, 2014

(65) Prior Publication Data
US 2014/0326455 A1    Nov. 6, 2014

Related U.S. Application Data

(60) Provisional application No. 61/755,604, filed on Jan. 23, 2013, provisional application No. 61/707,128, filed on Sep. 28, 2012.

(51) Int. Cl.
| | |
|---|---|
| *C04B 28/02* | (2006.01) |
| *C09K 8/487* | (2006.01) |
| *C09K 8/467* | (2006.01) |
| *C04B 7/02* | (2006.01) |
| *C04B 18/06* | (2006.01) |
| *C04B 24/26* | (2006.01) |
| *E21B 33/14* | (2006.01) |

(52) U.S. Cl.
CPC ............... *C09K 8/487* (2013.01); *C04B 7/02* (2013.01); *C04B 18/067* (2013.01); *C04B 24/2682* (2013.01); *C04B 28/02* (2013.01); *C09K 8/467* (2013.01); *E21B 33/14* (2013.01); Y02W 30/94 (2015.05)

(58) Field of Classification Search
CPC C04B 7/02; C04B 8/467; C04B 8/487; C04B 18/067; C04B 18/146; C04B 22/124; C04B 24/2652; C04B 24/2682; C04B 28/02; C04B 33/14; C04B 2103/0049; C04B 2103/0088; C04B 2103/40; C04B 2103/46; C04B 2103/50
See application file for complete search history.

(56) References Cited

U.S. PATENT DOCUMENTS

| | | | |
|---|---|---|---|
| 4,640,942 A | 2/1987 | Brothers | |
| 5,510,436 A | 4/1996 | Hille et al. | |
| 5,571,318 A | 11/1996 | Griffith et al. | |
| 2004/0144537 A1 | 7/2004 | Reddy et al. | |
| 2004/0187740 A1 | 9/2004 | Timmons | |
| 2005/0000734 A1 | 1/2005 | Getzlaf et al. | |
| 2006/0108150 A1* | 5/2006 | Luke | C04B 14/047 175/64 |
| 2007/0039734 A1* | 2/2007 | Di Lullo Arias | C04B 28/02 166/292 |
| 2007/0102160 A1 | 5/2007 | Jones et al. | |
| 2007/0203028 A1 | 8/2007 | Lewis et al. | |
| 2007/0256603 A1 | 11/2007 | Heinbigner et al. | |
| 2009/0163388 A1 | 6/2009 | Reddy et al. | |
| 2010/0095871 A1* | 4/2010 | Patil | C04B 14/303 106/692 |
| 2010/0155069 A1 | 6/2010 | Morgan et al. | |
| 2011/0028593 A1 | 2/2011 | Roddy et al. | |
| 2011/0048709 A1 | 3/2011 | Patil et al. | |
| 2012/0172518 A1 | 7/2012 | Roddy et al. | |

(Continued)

FOREIGN PATENT DOCUMENTS

| | | | |
|---|---|---|---|
| CN | 101691485 A | * | 4/2010 |
| EP | 0196689 A1 | | 10/1986 |

(Continued)

OTHER PUBLICATIONS

HES Brochure "Halad-413 Fluid Loss Additive" (Aug. 2007).*
EP Supplementary Search Report dated Apr. 20, 2016, received in correspondence EP Application No. 13842300.9.
ANSI/API Recommended Practice 10B-5, First Edition, Apr. 2005, Recommended Practice on Determination of Shrinkage and Expansion of Well Cement Formulations at Atmospheric Pressure, ISO 10426-5:2004 (Identical), Petroleum and natural gas industries-Cements and materials for well cementing—Part 5: Determination of shrinkage and expansion of well cement formulations at atmospheric pressure.
ANSI/API Recommended Practice 10B-2, First Edition, Jul. 2005, Recommended Practice for Testing Well Cements, ISO 10426-2:2003 (Identical), Petroleum and natural gas industries—Cements and materials for well cementing—Part 2: Testing of Well Cements, Amendment 1: Water-wetting capability testing.

(Continued)

*Primary Examiner* — Anthony J Green
(74) *Attorney, Agent, or Firm* — McDermott Will & Emery LLP

(57) ABSTRACT

Methods and compositions for treating a subterranean formation with salt-tolerant cement slurries including treating a salt-containing subterranean formation having sodium salts, potassium salts, magnesium salts, calcium salts, or any combination thereof comprising: providing a salt-tolerant cement slurry comprising: a base fluid, a cementitious material, a pozzolanic material, a salt-tolerant fluid loss additive, a salt additive, and optionally, an elastomer, a weight additive, a fluid loss intensifier, a strengthening agent, a dispersant, or any combination thereof; introducing the salt-tolerant cement slurry into the subterranean formation; and allowing the salt-tolerant cement slurry to set.

18 Claims, 1 Drawing Sheet

(56) References Cited

U.S. PATENT DOCUMENTS

2012/0325478 A1* 12/2012 Muthusamy .......... C04B 28/021
  166/293
2013/0217603 A1 8/2013 Jamison et al.

FOREIGN PATENT DOCUMENTS

| EP | 1375819 A1 | 1/2004 |
| KR | 20070045259 A | 5/2007 |
| WO | 2012061147 A1 | 5/2012 |
| WO | 2014052182 A1 | 4/2014 |

OTHER PUBLICATIONS

ANSI/API Recommended Practice 10B-5, First Edition, Apr. 2005, Recommended Practice on Determination of Shrinkage and Expansion of Well Cement Formulations at Atmospheric Pressure, ISO 10426-5:2004 (Identical), Petroleum and natural gas industries—Cements and materials for well cementing—Part 5: Determination of shrinkage and expansion of well cement formulations at atmospheric pressure.

International Search Report and Written Opinion for PCT/US2013/060843 dated Dec. 18, 2013.

* cited by examiner

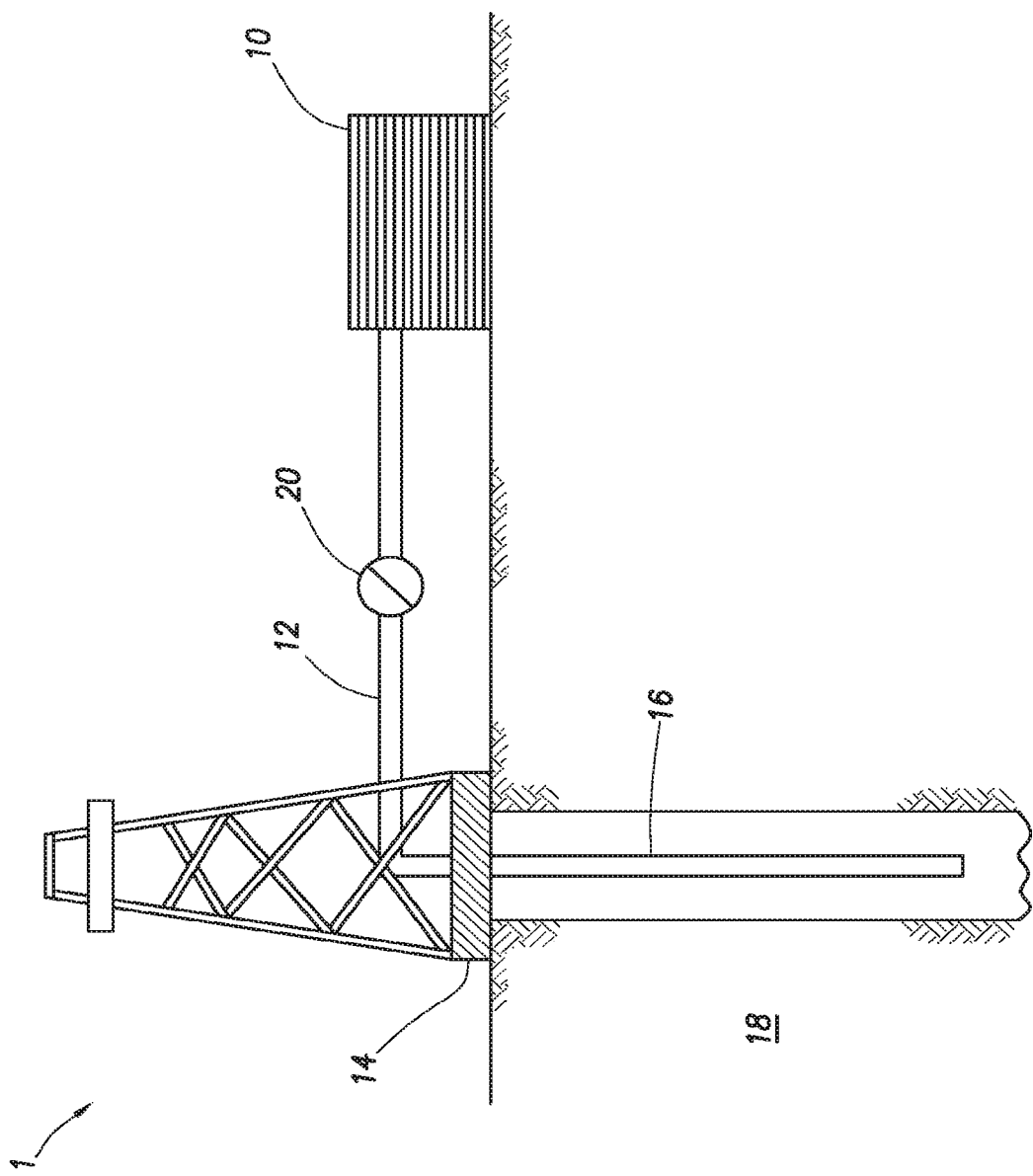

METHODS AND COMPOSITIONS FOR TREATING A SUBTERRANEAN FORMATION WITH SALT-TOLERANT CEMENT SLURRIES

CROSS-REFERENCE TO RELATED APPLICATIONS

This application claims priority to PCT Application Serial No. PCT/US2013/060843 filed on Sep. 20, 2013 titled "Methods and Compositions for Treating a Subterranean Formation with Salt-Tolerant Cement Slurries," which claims priority to provisional application No. 61/755,604 filed on Jan. 23, 2013 and titled "Methods and Compositions for Treating a Subterranean Formation with Salt-Tolerant Cement Slurries" and also to provisional application No. 61/707,128 filed on Sep. 28, 2012, and titled "Methods for Treating a Subterranean Formation with Salt-Tolerant Cement Compositions."

BACKGROUND

The embodiments herein relate to methods and compositions for treating a subterranean formation with salt-tolerant cement slurries.

Various methods are known for completing a subterranean formation in order to recover hydrocarbons, natural gas, or other extractable substances from the formation (e.g., open-hole completions, liner completions, cased hole completions, etc.). During many completion operations, a casing is inserted into a drilled well and a cement slurry is pushed through the bottom of the casing and out through an annulus between the outer casing wall and the formation face. The cement slurry then cures in the annular space, thereby forming a sheath of hardened, substantially impermeable cement (a "cement sheath") that, inter alia, supports and positions the casing in the wellbore and bonds the exterior surface of the casing to the subterranean formation. Among other things, the cement sheath surrounding the casing serves to prevent contamination of non-hydrocarbon zones from contacting the produced hydrocarbons. For example, the cement sheath may keep fresh water zones from becoming contaminated with produced fluids or gases from within the casing. The cement sheath may also prevent unstable formations from caving in, thereby reducing the chance of a stuck drill pipe or a casing collapse. Finally, the cement sheath forms a solid barrier to prevent fluid loss or contamination of production zones. The degree of success of a completion operation (e.g., fracturing and fluid recovery) therefore depends, at least in part, upon the adequate cementing of the wellbore casing.

Salt formations are encountered in many oil-producing regions. Salt formations, particularly those containing, but not limited to, sodium, potassium, calcium and magnesium monovalent and divalent cations (e.g., Na+, K+, Ca+, and Mg+), may interfere with the ability of traditional cement slurries to form a satisfactory cement sheath. The cations from the salt formation may creep into, contaminate, and chemically react with the cement slurry. For example, divalent cations may viscosify (or gel) the cement slurry, altering the setting properties and thus the final mechanical strength of the cement slurry, often resulting in improper zonal isolation and/or casing collapses. Traditional cement slurries are unable to thwart the effects of salt contamination while still maintaining the desired cementing properties. Therefore, a cement slurry composition and a method of preparing said cement slurry that is capable of mitigating or eliminating the gelling effects of salt contamination for use in oil-producing regions with salt formations, without compromising the cement slurry's cementing capabilities (e.g., complete zonal isolation) would be beneficial to one of ordinary skill in the art.

BRIEF DESCRIPTION OF THE DRAWINGS

The following FIGURE is included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

The FIGURE depicts an embodiment of a system configured for delivering the salt-tolerant cement slurries of the embodiments described herein to a downhole location.

DETAILED DESCRIPTION

The embodiments herein relate to methods and compositions for treating a subterranean formation with salt-tolerant cement slurries. Specifically, the embodiments herein relate to compatibility studies used to develop cement slurries that are compatible with salts, such as sodium salts, potassium salts, magnesium salts, calcium salts, and any combination thereof.

Traditional cement slurries for use in cementing downhole casings are typically not salt-tolerant. Thus, salt contamination of the cement slurries may result in improper functioning of the cement slurry and lead to compromised or poor recovery of produced fluids or gases during oil well production. The embodiments herein relate to methods for treating a subterranean formation with salt-tolerant cement slurries that mitigate or eliminate the effects of salt contamination in salt formation zones. As used herein, the term "salt-tolerant cement slurry" refers to a cement slurry that is capable of substantially maintaining its cement sheath integrity upon salt contamination. Among other reasons, because the salt-tolerant cement slurries described herein are more elastic and resilient than traditional cement slurries, they are able to resist deformation due to salt creeping. Moreover, the properties of the salt-tolerant cement slurries of (e.g., thickening time and compressive strength) may remain essentially unchanged after salt contamination.

The rheological properties of a cement slurry determines the slurry's gellation, flowability, and stability and, ultimately, its end-use performance. A cement slurry that is salt-tolerant must therefore also possess the appropriate rheological properties to perform its required cementing functions. A cement slurry is generally considered adequate for use in subterranean operations and sufficiently pumpable when it exhibits a plastic viscosity ("PV") of less than about 500 cP and a yield point ("YP") of less than about 200 lb/100 ft$^2$, as defined by the conventional Bingham Plastic viscosity model. In some embodiments, the salt-tolerant cement slurry of the embodiments described herein has a PV of less than about 500 cP and a YP of less than about 30 lb/100 ft$^2$. In other embodiments, the salt-tolerant cement slurry of the embodiments herein has a PV in the range of a lower limit of about 120 cP, 140 cP, 160 cP, 180 cP, 200 cP, 220 cP, 240 cP, 260 cP, 280 cP, and 300 cP to an upper limit of about 500 cP, 480 cP, 460 cP, 440 cP, 420 cP, 400 cP, 380 cP, 360 cP, 340 cP, 320 cP, and 300 cP and a YP in the range of a lower limit of about 5 lb/100 ft$^2$, 25 lb/100 ft$^2$, 50 lb/100 ft$^2$, 75 lb/100 ft$^2$, and 100 lb/100 ft$^2$ to an upper limit of about 200 lb/100 ft$^2$, 175 lb/100 ft$^2$, 150 lb/100 ft$^2$, 125 lb/100 ft$^2$, and 100 lb/100 ft$^2$.

In some embodiments, method of treating subterranean formation having sodium salts, potassium salts, magnesium salts, calcium salts, or any combination thereof is provided. The methods use the salt-tolerant cement slurry compositions disclosed herein comprising: a base fluid; a cementitious material; a pozzolanic material; an elastomer; a weight additive; a strengthening agent; a dispersant; a salt-tolerant fluid loss additive; a fluid loss intensifier; and a salt additive. In some embodiments, the salt-tolerant cement slurry compositions further comprise a defoaming agent. In some embodiments, the methods of the embodiments described herein include introducing the salt-tolerant cement slurry into a salt-containing subterranean formation, and setting it therein to form a hardened mass.

I. Base Fluid

Any aqueous base fluid suitable for use in a subterranean operation (e.g., drilling or completion operations) may be used in the salt-tolerant cement slurry of the disclosed herein. Suitable base fluids may include, but are not limited to freshwater, saltwater (e.g., water containing one or more salts dissolved therein), brine (e.g., saturated saltwater), seawater, and any combination thereof. Generally, the base fluid may be from any source, provided, for example, that it does not contain an excess of compounds that may undesirably affect other components in the salt-tolerant cement slurry. In some embodiments, the base fluid may be included in an amount sufficient to form a pumpable slurry. Generally, the base fluid is added to balance the remaining ingredients rather than in a certain weight percentage. However, in some embodiments, the base fluid may be included in the salt-tolerant cement slurries in an amount in the range of a lower limit of about 30% by weight ("w/w"), 40% w/w, 50% w/w, 60% w/w, 70% w/w, 80% w/w, 90% w/w, 100% w/w, 110% w/w, and 120% w/w to an upper limit of about 200% w/w, 190% w/w, 180% w/w, 170% w/w, 160% w/w, 150% w/w, 140% w/w, 130% w/w, and 120% w/w of the complete dry components of the cement slurry. In some embodiments, the base fluid may be included in an amount of about 30% to about 150% w/w of the complete dry components of the cement slurry.

II. Cementitious Material

The cementitious material may be any cementitious material suitable for use in subterranean operations. In preferred embodiments, the cementitious material is a hydraulic cement. Hydraulic cements harden by the process of hydration due to chemical reactions to produce insoluble hydrates (e.g., calcium hydroxide) that occur independent of the cement's water content (e.g., hydraulic cements can harden even under constantly damp conditions). Thus, hydraulic cements are preferred because they are capable of hardening regardless of the water content of a particular subterranean formation. Suitable hydraulic cements include, but are not limited to Portland cement; Portland cement blends (e.g., Portland blast-furnace slag cement and/or expansive cement); non-Portland hydraulic cement (e.g., super-sulfated cement, calcium aluminate cement, and/or high magnesium-content cement); and any combination thereof. In some embodiments, the cementitious material may be present in an amount ranging from a lower level of at least about 5%, 10%, 15%, 20%, 25%, 30%, or 35% to an upper level of equal to or less than about 60%, 55%, 50%, 45%, 40%, or 35%, wherein each of the percentages are w/w of the complete dry components of the cement slurry. In preferred embodiments, the cementitious material may be present in an amount of about 30% to about 60% w/w of the complete dry components of the cement slurry.

III. Pozzolanic Material

The pozzolanic material may aid in increasing the density and strength of the cementitious material. As used herein the term "pozzolanic material" refers to a siliceous material that, while not being cementitious, is capable of reacting with calcium hydroxide (which may be produced during hydration of a cementitious material) in the presence of water to form a material possessing the qualities of cementitious material. Because calcium hydroxide accounts for a sizable portion of most hydrated hydraulic cements and because calcium hydroxide does not contribute to the cement's properties, the combination of cementitious and pozzolanic materials may synergistically enhance the strength and quality of the cement. Any pozzolanic material that is reactive with the cementitious material may be used in the methods and compositions of the embodiments described herein. Suitable pozzolanic materials include, but are not limited to silica fume, metakaolin, fly ash, diatomaceous earth, calcined or uncalcined diatomite, calcined fullers earth, pozzolanic clays, calcined or uncalcined volcanic ash, bagasse ash, pumice, pumicite, rice hull ash, natural and synthetic zeolites, slag, vitreous calcium aluminosilicate, and any combination thereof. Preferred pozzolanic materials may include, but are not limited to, silica fume, fly ash, and slag, as they are particularly reactive. An example of a suitable commercially-available pozzolanic material is POZ-MIX®-A available from Halliburton Energy Services, Inc. of Houston, Tex. In some embodiments, the pozzolanic material may be present in an amount ranging from a lower level of at least about 0%, 0.001%, 0.01%, 0.1%, 5%, 10%, 15%, 20%, 25%, or 30%, to an upper level of equal to or less than about 40%, 35%, or 30%, wherein each of the percentages are w/w of the complete dry components of the cement slurry.

IV. Elastomer

In some embodiments, the salt-tolerant cement slurry disclosed herein further comprises an elastomer. The elastomers may be used to impart elasticity to the cement sheath of the salt-tolerant cement slurry, thereby potentially counteracting possible stresses that may be encountered by the cement due to creeping of a salt zone. In some embodiments, the elastomers may swell upon contact with water and/or oil (e.g., up to 500% of their original size). Such swelling may aid in maintaining zonal isolation in salt formations, for example, by swelling when contacted with water and/or oil to seal vulnerable spaces or cracks in the cement sheath. In preferred embodiments, the elastomer swells upon contact with oil. The elastomers may additionally be weighted using a weighting agent. Weighting agents are typically materials that weigh more than water and may be used to increase the density of a cement slurry. Suitable weighting may include, but are not limited to, hematite, hausmannite, barite, sand, $MnO_2$, and any combination thereof. Examples of commercially-available heavy weight elastomers are WellLife®-930 and WellLife®-987, available from Halliburton Energy Services, Inc. of Houston, Tex. Suitable swellable and weighted elastomers and their methods of use can be found in U.S. Patent Pub. No. 2011/0028593, filed Jul. 29, 2009, the entire disclosure of which is hereby incorporated by reference.

Generally, the elastomers of the embodiments herein may be used in particulate form. As used herein, the term "particulate" refers to materials in solid state having a well-defined physical shape, including regular and irregular geometries. Elastomers may have the shape of, for example, platelets, shavings, fibers, flakes, ribbons, rods, strips, spheroids, hollow beads, toroids, pellets, tablets, or any other physical shape. Suitable elastomers may include, but are not limited to, polypropylene, polyethylene, styrene divinyl benzene, polyisoprene, polybutadiene, polyisobutylene, polyurethane, a styrene-butadiene random copolymer, a styrene-butadiene block copolymer, acrylonitrile butadiene, acrylonitrile-styrene-butadiene, and any combinations thereof. In some embodiments, the elastomer material may be present in an amount ranging from a lower level of at least about 0%, 0.001%, 0.01%, 0.1%, 1%, 2%, 4%, 8%, or 10% to an upper level of equal to or less than about 20%, 18%, 16%, 14%, 12%, or 10%, wherein each of the percentages are w/w of the complete dry components of the cement slurry.

V. Weight Additive

Weight additives suitable may be used to increase the density of the salt-tolerant cement slurry such that the hydrostatic pressure exerted by the salt-tolerant cement slurry is balanced against the formation pore pressure to stabilize the strength and permeability (e.g., salt contamination) of the cement. Weight additives are high-specific gravity solid particulates and may include, but are not limited to, hausmannite ore, barite, hermatite ($Fe_2O_3$), calcium carbonate, siderite ($FeCO_3$), ilmenite ($FeO.TiO_2$), and any combinations thereof. Any weighting agent suitable for use with the elastomers described herein may additionally be used as a weight additive. Examples of commercially-available weight additives suitable for use in the embodiments described herein may include, but are not limited to MICROMAX® and Hi-Dense® No. 4, available from Halliburton Energy Services, Inc. of Houston, Tex. Another example of a commercially-available weight additive suitable may include, but is not limited to, BARIMITE™, available from CIMBAR Performance Minerals in Cartersville, Ga.

Typically, the density of the weight additives of the of the embodiments disclosed herein range from about 1.05 g/cm$^3$ to about 5.5 g/cm$^3$. For example, calcium carbonate has a minimum specific gravity of about 2.7 g/cm$^3$ and hematite has a minimum specific gravity of about 5.1 g/cm$^3$. In some embodiments, the weighting agent may be present in an amount ranging from a lower level of at least about 0%, 0.001%, 0.01%, 0.1%, 1%, 2%, 4%, 6%, 8%, 10%, 12%, 14%, 18%, or 20% to an upper level of equal to or less than about 30%, 28%, 26%, 24%, 22%, or 20%, wherein each of the percentages are w/w of the complete dry cement composition.

VI. Strengthening Agent

In some embodiments, a strengthening agent may be added to the salt-tolerant cement slurry compositions. A strengthening agent may be used to aid in the stabilization and permeability of a cement at bottomhole temperature extremes, typically exceeding about 200° F. The strengthening agent may be capable of improving or enhancing low permeability and high compressive strength in a cement sheath by imparting resistance against high temperatures that often can cause stability degradation to cement. Typical strengthening agents may include, but are not limited to, silica flour and silica fume. Examples of commercially-available strengthening agents suitable for use in the embodiments described herein include, but are not limited to SSA-1™ and SSA-2™, available from Halliburton Energy Services, Inc. of Houston, Tex. In some embodiments, the strengthening may be present in an amount ranging from a lower level of at least about 0%, 0.001%, 0.01%, 0.1%, 5%, 10%, 15%, 20%, 25%, or 30%, to an upper level of equal to or less than about 40%, 35%, or 30%, wherein each of the percentages are w/w of the complete dry components of the cement slurry.

VII. Dispersant

Dispersants suitable for use in the embodiments described herein may affect the cement's rheological properties and reduce its apparent viscosity. The dispersant may thus allow turbulent flow to be achieved at lower pumping rates, resulting in reduced friction pressure during pumping. Additionally, adequately dispersed cement slurries exhibit improved fluid-loss control. Suitable dispersants for use in the salt-tolerant cement slurries may include, but are not limited to, sulfonated styrene maleic anhydride copolymer, sulfonated vinyltoluene maleic anhydride copolymer, sodium naphthalene sulfonate condensed with formaldehyde, sulfonated acetone condensed with formaldehyde, lignosulfonates and interpolymers of acrylic acid, allyloxybenzene sulfonate, allyl sulfonate and non-ionic monomers, and any combination thereof. An example of a suitable commercially available dispersant is CFR-3™ available from Halliburton Energy Services, Inc. of Houston, Tex. In some embodiments, the dispersant may be present in an amount ranging from a lower level of at least about 0%, 0.001%, 0.01%, 0.1%, 0.5%, 1%, 1.5%, or 2%, to an upper level of equal to or less than about 4%, 3.5%, 3%, 2.5%, or 2%, wherein each of the percentages are w/w of the complete dry components of the cement slurry.

VIII. Salt-Tolerant Fluid Loss Additive

"Fluid loss," as that term is used herein, refers to the undesirable migration or loss of fluids into a subterranean formation. Fluid loss may result in the build up of materials on the subterranean formation ("filter cake") inhibiting hydrocarbon production. Additionally, the loss of fluid from a cement slurry such as the salt-tolerant cement slurry disclosed herein may leach the necessary components to render the cement rheologically functional or salt-tolerant capable. Fluid loss additives lower the volume of a filtrate that passes through a filter medium. That is, they block the pore throats and spaces that otherwise allow a fluid to leak out of a desired zone and into an undesired zone. The salt-tolerant fluid loss additives may comprise an amphoteric copolymer including, but not limited to, an amphoteric copolymer of 2-acrylamido-2-methylpropane sulfonic acid and diallyldimethylammonium chloride. In some embodiments, the salt-tolerant fluid loss additive may be present in an amount ranging from a lower level of at least about 0%, 0.001%, 0.01%, 0.1%, 0.2%, 0.4%, 0.6%, 0.8%, 1%, 1.2%, 1.4%, or 1.6%, to an upper level of equal to or less than about 3%, 2.8%, 2.6%, 2.4%, 2.2%, 2%, 1.8%, or 1.6% wherein each of the percentages are w/w of the complete dry components of the cement slurry. In preferred embodiments, the salt-tolerant fluid loss additive may be present in an amount of about 0.2% to about 3% w/w of the complete dry components of the cement slurry.

IX. Fluid Loss Intensifier

The fluid loss intensifier of some embodiments disclosed herein may operate synergistically with the salt-tolerant fluid loss additive to facilitate fluid loss control. Suitable fluid loss intensifiers may include, but are not limited to, 2-acrylamido-2-methylpropane sulfonic acid, N,N dimethyl acrylamide, acrylamide terpolymer, copolymers thereof, any derivatives thereof, and any combination thereof. Examples of suitable commercially-available fluid loss intensifiers for use in the salt-tolerant cement compositions of the embodiments described herein may include, but are not limited to, Halad®-413 and Halad®-862, available from Halliburton Energy Services, Inc. of Houston, Tex. In some embodiments, the fluid loss intensifier may be present in an amount ranging from a lower level of at least about 0%, 0.001%, 0.01%, 0.05%, 0.1%, 0.2%, 0.3%, 0.4%, 0.5%, 0.6%, 0.7%, 0.8%, 0.9%, or 1% to an upper level of equal to or less than about 2%, 1.9%, 1.8%, 1.7%, 1.6%, 1.5%, 1.4%, 1.3%, 1.2% or 1% wherein each of the percentages are w/w of the complete dry components of the cement slurry.

X. Salt Additive

The salt-tolerant cement slurries of the embodiments disclosed herein may further comprise a salt additive. The salt additive may serve a dual purpose. First, the salt additive may prevent the cement slurry from reacting with formation chemistries to form particularly damaging salt products (e.g., MgCl). Second, the presence of the salt additive may prevent further dissolution of formation salts due to the cement slurry having spent its reactive chemistries on the salt present. The salt additive may be any simple salt compatible with use in a subterranean formation. In preferred embodiments, the salt additive includes, but is not limited to sodium chloride and/or potassium chloride. In some embodiments, the salt additive may be present in an amount ranging from a lower level of at least about 15%, 18%, 20%, 22%, 24%, 26%, 28%, or 30%, to an upper level of equal to or less than about 40%, 38%, 36%, 34%, 32%, or 30% wherein each of the percentages are w/w of the complete dry components of the cement slurry. In preferred embodiments, the salt additive may be present in an amount of about 18% to about 40% w/w of the complete dry components of the cement slurry. In even more preferred embodiments, the salt additive may be present in an amount of about 36% w/w of the complete dry components of the cement slurry.

XI. Defoaming Agent

Defoaming agents suitable for use in the embodiments described herein may be used to prevent foaming of the salt-tolerant cement slurry and its components. The defoaming agents may be capable of eliminating trapped air and preventing the formation of entrained air that could compress down hole. Foaming is of a particular concern when salt contamination from the formation is likely because a cement slurry that has foamed may exhibit cracks or spaces for which the salt to easily enter; defoaming agents minimize or eliminate these spaces. Suitable defoaming agents for use in the embodiments disclosed herein may include, but are not limited to, octyl alcohols, aluminum stearates, glycols, silicone, sulfonated hydrocarbons, fatty alcohols, fatty acid soaps, fatty acid esters, ethylene bis stearamides, derivatives thereof, and any combination thereof. An example of a suitable commercially-available defoaming agent is D-AIR™ series of defoaming agents available from Halliburton Energy Services, Inc. of Houston, Tex. In certain embodiments, the defoaming agent may be present in an amount of about 0.01% to about 2% w/w of the dry cementitious material. In preferred embodiments, the defoaming agent may be present in an amount ranging from a lower lever of at least about 0%, 0.001%, 0.01% 0.02%, 0.03%, 0.04%, or 0.05% to an upper level of equal to or less than 1%, 0.09%, 0.08%, 0.07%, 0.06%, or 0.05% w/w of the complete dry components of the cement slurry.

In various embodiments, systems configured for preparing, transporting, and delivering the salt-tolerant cement slurries described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a salt-tolerant cement slurry. The pump may be, for example, a high pressure pump or a low pressure pump, which may depend on, inter alia, the viscosity and density of the salt-tolerant cement slurry, the type of the cementing operation, and the like.

In some embodiments, the systems described herein may further comprise a mixing tank arranged upstream of the pump and in which the salt-tolerant cement slurry is formulated. In various embodiments, the pump (e.g., a low pressure pump, a high pressure pump, or a combination thereof) may convey the salt-tolerant cement slurry from the mixing tank or other source of the salt-tolerant cement slurry to the tubular. In other embodiments, however, the salt-tolerant cement slurry can be formulated offsite and transported to a worksite, in which case the salt-tolerant cement slurry may be introduced to the tubular via the pump directly from a transport vehicle or a shipping container (e.g., a truck, a railcar, a barge, or the like) or from a transport pipeline. In yet other embodiments, the cementing fluid may be formulated on the fly at the well site where components of the cementing fluid are pumped from a transport (e.g., a vehicle or pipeline) and mixed during introduction into the tubular. In any case, the salt-tolerant cement slurry may be drawn into the pump, elevated to an appropriate pressure, and then introduced into the tubular for delivery downhole.

The FIGURE shows an illustrative schematic of a system that can deliver salt-tolerant cement slurry of the present invention to a downhole location, according to one or more embodiments. It should be noted that while the FIGURE generally depicts a land-based system, it is to be recognized that like systems may be operated in subsea locations as well. As depicted in the FIGURE, system 1 may include mixing tank 10, in which a salt-tolerant cement slurry of the present invention may be formulated. Again, in some embodiments, the mixing tank 10 may represent or otherwise be replaced with a transport vehicle or shipping container configured to deliver or otherwise convey the cementing fluid to the well site. The salt-tolerant cement slurry may be conveyed via line 12 to wellhead 14, where the salt-tolerant cement slurry enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the salt-tolerant cement slurry may subsequently return up the wellbore in the annulus between the tubular 16 and the wellbore 22 as indicated by flow lines 24. In other embodiments, the salt-tolerant cement slurry may be reverse pumped down through the annulus and up tubular 16 back to the surface, without departing from the scope of the disclosure. Pump 20 may be configured to raise the pressure of the salt-tolerant cement slurry to a desired degree before its introduction into tubular 16 (or annulus). It is to be recognized that system 1 is merely exemplary in nature and various additional components may be present that have not necessarily been depicted in the FIGURE in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in the FIGURE to provide for other cementing operations (e.g., squeeze operations, reverse cementing (where the cement is introduced into an annulus between a tubular and the wellbore and returns to the wellhead through the tubular), and the like).

It is also to be recognized that the disclosed salt-tolerant cement slurries may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in the FIGURE.

Embodiments disclosed herein include:

A. A method of treating a salt-containing subterranean formation having sodium salts, potassium salts, magnesium salts, calcium salts, or any combination thereof comprising: providing a salt-tolerant cement slurry comprising: a base fluid, a cementitious material, a pozzolanic material, a salt-tolerant fluid loss additive, a salt additive, and optionally, an elastomer, a weight additive, a fluid loss intensifier, a strengthening agent, a dispersant, or any combination thereof; introducing the salt-tolerant cement slurry into the subterranean formation; and allowing the salt-tolerant cement slurry to set.

B. A salt-tolerant cement slurry comprising: a cementitious material; a pozzolanic material; a salt-tolerant fluid loss additive; a salt additive; and optionally, an elastomer, a weight additive, a fluid loss intensifier, a strengthening agent, a dispersant, or any combination thereof.

C. A salt-tolerant cement slurry comprising: dry components, wherein the dry components comprise: a cementitious material, wherein the cementitious material is present in a range of about 5% to about 60% w/w of the dry components, a pozzolanic material, wherein the pozzolanic material is present in a range of about 0.001% to about 60% w/w of the dry components, an elastomer, wherein the elastomer is present in a range of about 0.001% to about 20% w/w of the dry components, a weight additive, wherein the weight additive is present in a range of about 0.001% to about 30% w/w of the dry components, a strengthening agent, wherein the strengthening agent is present in a range of about 0.001% to about 40% w/w of the dry components, a dispersant, wherein the dispersant is present in a range of about 0.001% to about 4% w/w of the dry components, a salt-tolerant fluid loss additive, wherein the salt-tolerant fluid loss additive is an amphoteric copolymer and wherein the salt-tolerant fluid loss additive is present in a range of about 0.001% to about 3% w/w of the dry components, a fluid loss intensifier, wherein the fluid loss intensifier is present in a range of about 0.001% to about 2% w/w, and a salt additive, wherein the salt additive is present in the range of about 15% to about 40% w/w; and a base fluid, wherein the base fluid is present in an amount to balance the dry components.

Each of embodiments A, B, and C may have one or more of the following additional elements in any combination Element 1: Wherein the cementitious material is a hydraulic cement.

Element 2: Wherein the pozzolanic material is selected from the group consisting of silica fume; metakaolin; fly ash; diatomaceous earth; calcined diatomite; uncalcined diatomite; calcined fullers earth; pozzolanic clay; calcined volcanic ash; uncalcined volcanic ash; bagasse ash; pumice; pumicite; rice hull ash; natural zeolite; synthetic zeolite; slag; vitreous calcium aluminosilicate; and any combination thereof.

Element 3: Wherein the salt-tolerant fluid loss additive is an amphoteric copolymer.

Element 4: Wherein salt tolerant cement slurry has a yield point in the range of about 5 to about 200 lb/100 ft$^2$ and a plastic viscosity in the range of about 120 to about 500 cP.

Element 5: Wherein the elastomer is selected from the group consisting of polypropylene; polyethylene; styrene divinyl benzene; polyisoprene; polybutadiene; polyisobutylene; polyurethane; a styrene-butadiene random copolymer; a styrene-butadiene block copolymer; acrylonitrile butadiene; acrylonitrile-styrene-butadiene; and any combination thereof.

Element 6: Wherein the weighting additive is selected from the group consisting of hausmannite ore; barite, hermatite; calcium carbonate; siderite; ilmenite; and any combination thereof.

Element 7: Wherein the strengthening agent is selected from the group consisting of silica flour; silica fume; and any combination thereof.

Element 8: Wherein the dispersant is selected from the group consisting of sulfonated styrene maleic anhydride copolymer, sulfonated vinyltoluene maleic anhydride copolymer, sodium naphthalene sulfonate condensed with formaldehyde, sulfonated acetone condensed with formaldehyde, lignosulfonates and interpolymers of acrylic acid, allyloxybenzene sulfonate, allyl sulfonate and non-ionic monomers, and any combination thereof.

Element 9: Wherein the fluid loss intensifier is selected from the group consisting of 2-acrylamido-2-methylpropane sulfonic acid; N,N dimethyl acrylamide; acrylamide terpolymer; a copolymer thereof; any derivatives thereof; and any combination thereof.

By way of non-limiting example, exemplary combinations applicable to A, B, C include: A with 1, 4, and 9; A with 1, 2, 7, and 8; B with 2, 5, and 6; B with 6, 7, 8, and 9; C with 1, 2, and 3; and C with 4, 5, and 9.

To facilitate a better understanding of the embodiments described herein, the following examples of preferred or representative embodiments are given. In no way should the following examples be read to limit, or to define, the scope of the disclosure.

Example 1

The following test was performed to evaluate the salt tolerance and rheological properties of a POZMIX®-A-containing salt-tolerant cement slurry composition prepared consistent with the embodiments disclosed herein. As set forth below, the test results demonstrate that the POZMIX®-A-containing salt-tolerant cement slurry is capable of maintaining good rheological and fluid loss properties at up to about 12% salt contamination.

The POZMIX®-A-containing cement slurry comprised 50% w/w of Portland Cement, 24% w/w POZMIX®-A, 16% w/w MICROMAX®, 10% w/w SSA-2™, 2% w/w CFR-3™, 1.8% w/w salt-tolerant fluid loss additive comprised of an amphoteric copolymer of 2-acrylamido-2-methylpropane sulfonic acid and diallyldimethylammonium chloride, 0.2% w/w Halad®-413, 10% w/w WellLife®-930, 0.1 gps D-AIR 3000L™ (a defoamer available from Halliburton Energy Services, Inc. of Houston, Tex.), 36% w/w NaCl, and 45.8% w/w water.

After the POZMIX®-A-containing cement slurry was prepared, several tests were performed to determine the slurry's properties. A slurry sedimentation test was performed in accordance with *API RP* 10*B-2/ISO* 10426-2, *Section* 15 to determine if the POZMIX®-A-containing cement exhibits partial sedimentation. Based on the sedimentation test, the top to bottom density variation of the slurry was only about 2%. Additionally, the POZMIX®-A-containing cement slurry was tested for fluid loss in accordance with *API RP*10B-2/*ISO* 10426-2, *Section* 10, shrinkage in accordance with *API RP* 10 *B-5/ISO* 10426-5, and free fluid in accordance with *API RP*10*B-2/ISO* 10426-2, *Section* 15.5. No shrinkage in the POZMIX®-A-containing cement column was observed, indicating that the chance of fluid or gas migration would be greatly reduced. The values for the slurry are provided below.

TABLE 1

| 1:1 mole ratio of MgCl$_2$, 6H$_2$O:KCl | API Fluid Loss at 160° F. & | Free | Shrinkage at 180° F. & 3000 psi | Sedimentation at 180° F., 3000 psi | | |
|---|---|---|---|---|---|---|
| (% weight-of-water) | 1000 psi (ml/30 min) | Fluid (ml) | after 3 days (%) | Top (ppg) | Middle (ppg) | Bottom (ppg) |
| 0 | 124 | 0 | 0 | 15.6 | 15.87 | 15.95 |

Tests were performed to determine the POZMIX®-A-containing cement slurry's rheological properties using the Herschel Bulkley and Bingham Plastic models. The plastic viscosity ("PV"), yield point ("YP"), consistency ("K"), and flow index ("n") were calculated at room temperature and after conditioning the slurry at 160° F. for two hours with contamination of 1:1 mole ratio of MgCl$_2$,6H$_2$O:KCl salt. The POZMIX®-A-containing cement slurry was contaminated with either about 6% weight-of-water 1:1 mole ratio of MgCl$_2$,6H$_2$O:KCl salt or about 12% weight-of-water 1:1 mole ratio of MgCl$_2$,6H$_2$O:KCl salt. For contaminating the slurry, all of the salt was added at once and the slurry was stirred vigorously for five minutes. The Herschel Bulkley and Bingham Plastic values are provided in the table below.

TABLE 2

| 1:1 mole ratio of MgCl$_2$, 6H$_2$O:KCl salt | | Herschel Bulkley Parameters | | | Bingham Plastic Parameters | |
|---|---|---|---|---|---|---|
| (% weight-of-water) | Temp (° F.) | YP (lb/100 ft$^2$) | K (lb-sec$^2$/ft$^2$) | n | YP (lb/100 ft$^2$) | PV (cP) |
| 0 | 80 | 4.6436 | 0.0247 | 0.7671 | 9.295 | 407.837 |
| 0 | 160 | 5.0668 | 0.0086 | 0.7980 | 6.614 | 163.662 |
| 6 | 160 | 15.405 | 0.0230 | 0.7370 | 19.838 | 330.348 |
| 12 | 160 | 20.044 | 0.0189 | 0.7900 | 23.499 | 347.287 |

The POZMIX®-A-containing cement slurry was tested after 2 hours of conditioning at 160° F. for its thickening time, compressive strength, and crush strength. Irrespective of the amount of salt contamination after 2 hours of conditioning in an atmospheric consistometer at 160° F., the time required to reach 100 Bearden units of consistency ("Bc") at 160° F. and 11000 psi remained roughly the same, as measured using an HPHT Fann Consistometer Model 290. Using an Ultrasonic Cement Analyzer at 180° F. and 3000 psi, the compressive (a nondestructive measurement) and crush strength (a destructive measurement) of the POZMIX®-A-containing cement slurry actually improved with salt contamination as compared to no salt contamination. The values are provided in the table below and are taken after the two-hour conditioning time elapsed.

After the Slag-containing cement slurry was prepared, several tests were performed to determine the slurry's properties. A slurry sedimentation test was performed in accordance with *API RP* 10*B*-2/*ISO* 10426-2, *Section* 15 to determine if the Slag-containing salt-tolerant cement slurry exhibits partial sedimentation. Based on the sedimentation test, the top to bottom density variation of the slurry was only about 2%. Additionally, the salt-tolerant cement slurry was tested for fluid loss in accordance with *API RP*10*B*-2/ *ISO* 10426-2, *Section* 10, shrinkage in accordance with *API RP* 10 *B*-5/*ISO* 10426-5, and free fluid in accordance with *API RP*10*B*-2/*ISO* 10426-2, *Section* 15.5. No shrinkage in the salt-tolerant cement column was observed, indicating that the chance of fluid or gas migration would be greatly reduced. The values for the slurry are provided below.

TABLE 4

| 1:1 mole ratio of $MgCl_2$, $6H_2O$:KCl | API Fluid Loss at 160° F. & | Free | Shrinkage at 180° F. & 3000 psi | Sedimentation at 180° F., 3000 psi | | |
|---|---|---|---|---|---|---|
| (% weight-of-water) | 1000 psi (ml/30 min) | Fluid (ml) | after 3 days (%) | Top (ppg) | Middle (ppg) | Bottom (ppg) |
| 0 | 116 | 0 | 0 | 15.85 | 15.90 | 16.23 |

TABLE 3

| 1:1 mole ratio of $MgCl_2$, $6H_2O$:KCl salt | Thickening Time at 160° F. & 11000 psi | | | Compressive Strength at 180° F. & 3000 psi | | 48 hr Crush Strength |
|---|---|---|---|---|---|---|
| (% weight-of-water) | (hr:min) | | | 50 psi (hr:min) | 24 hr (psi) | 48 hr (psi) | (psi) |
| water) | 50 Bc | 70 Bc | 100 Bc | (hr:min) | (psi) | (psi) | (psi) |
| 0 | 3:15 | 3:27 | 3:39 | 6:10 | 1044 | 1174 | 1439 |
| 6 | 3:10 | 3:33 | 3:45 | 6:35 | 1420 | 1549 | 2020 |
| 12 | 2:32 | 3:06 | 3:14 | 5:53 | 1217 | 1496 | 2370 |

Example 2

The following test was performed to evaluate the salt tolerance and rheological properties of a Slag-containing cement slurry composition prepared consistent with the embodiments described herein. As set forth below, the test results demonstrate that the Slag-containing cement slurry is capable of maintaining good rheological and fluid loss properties at up to about 12% weight-of-water salt contamination.

The Slag-containing cement slurry comprised 50% w/w of Portland Cement, 24% w/w Slag, 16% w/w MICRO-MAX®, 10% w/w SSA-2™, 2% w/w CFR-3™, 1.8% w/w salt-tolerant fluid loss additive comprised of an amphoteric copolymer of 2-acrylamido-2-methylpropane sulfonic acid and diallyldimethylammonium chloride, 0.2% w/w Halad®-413, 10% w/w WellLife®-930, 0.1 gps D-AIR 3000L™, 36% w/w NaCl, and 45.8% w/w water. The Slag used in the Slag-containing cement slurry was comprised of 5.30% magnesium oxide; 8.41% aluminum oxide; 29.69% silicon dioxide; 2.40 sulfur trioxide; 0.21% potassium oxide; 51.60% calcium oxide; 0.71% titanium dioxide; 0.96% manganese oxide; 0.54% iron oxide; and 0.18% strontium oxide.

Tests were performed to determine the Slag-containing cement slurry's rheological properties using a rheometer at 3, 6, 30, 60, 100, 200, and 300 RPMs. The rheology of the Slag-containing cement slurry was evaluated under the following conditions: (1) after conditioning for one hour at 80° F., (2) after conditioning for one hour at 160° F., and (3) after conditioning the slurry at 160° F. for one hour with contamination of about 12% weight-of-water 1:1 mole ratio of $MgCl_2$,$6H_2O$:KCl salt. For contaminating the slurry, all of the salt was added at once and the slurry was stirred vigorously for five minutes. The rheometer data is provided in Table 5.

TABLE 5

| RPM | Conditioning at 80° F. | Conditioning at 160° F. | Conditioning at 160° F. with 12% 1:1 mole ratio of $MgCl_2$, $6H_2O$:KCl salt (% weight-of-water) |
|---|---|---|---|
| 3 | 4 | 4 | 19 |
| 6 | 6 | 5 | 20 |
| 30 | 9 | 6 | 24 |
| 60 | 14 | 10 | 29 |
| 100 | 18 | 15 | 33 |
| 200 | 30 | 22 | 41 |
| 300 | 42 | 34 | 52 |

Tests were also performed to determine the Slag-containing cement slurry's rheological properties using the Herschel Bulkley, and Bingham Plastic models. The plastic viscosity ("PV"), yield point ("YP"), consistency ("K"), and flow index ("n") were calculated at room temperature and after conditioning the slurry at 160° F. for one hour with contamination of about 12% weight-of-water 1:1 mole ratio of $MgCl_2$,$6H_2O$:KCl salt. For contaminating the slurry, all of the salt was added at once and the slurry was stirred vigorously for five minutes. The Herschel Bulkley and Bingham Plastic values are provided in the Table 6.

TABLE 6

| 1:1 mole ratio of MgCl$_2$, 6H$_2$O:KCl salt (% weight-of-water) | Temp (° F.) | Herschel Bulkley Parameters | | | Bingham Plastic Parameters | |
|---|---|---|---|---|---|---|
| | | YP (lb/100 ft$^2$) | K (lb-sec$^2$/ft$^2$) | n | YP (lb/100 ft$^2$) | PV (cP) |
| 0 | 80 | 6.38 | 0.011 | 0.881 | 8 | 307 |
| 0 | 160 | 6 | 0.0051 | 1 | 6 | 243 |
| 12 | 160 | 28.13 | 0.0177 | 0.748 | 31.6 | 263.7 |

The Slag-containing cement slurry was tested after 1 hour of conditioning at 160° F. for its thickening time, compressive strength, and crush strength. After 1 hour of conditioning in an atmospheric consistometer at 160° F., the time required to reach 100 Bearden units of consistency ("Bc") at 160° F. and 11000 psi was actually longer for the Slag-containing cement slurry having salt contamination, as measured using an HPHT Fann Consistometer Model 290. Using an Ultrasonic Cement Analyzer at 180° F. and 3000 psi, the compressive (a nondestructive measurement) and crust strength (a destructive measurement) of the Slag-containing salt-tolerant cement slurry actually improved with salt contamination as compared to no salt contamination. The values are provided in the table below and are taken after the one-hour conditioning time elapsed.

TABLE 7

| 1:1 mole ratio of MgCl$_2$, 6H$_2$O:KCl salt (% weight-of-water) | Thickening Time at 160° F. & 11000 psi (hr:min) | | Compressive Strength at 180° F. & 3000 psi | | 48 hr Crush Strength |
|---|---|---|---|---|---|
| | 70 Bc | 100 Bc | 50 psi (hr:min) | 48 hr (psi) | (psi) |
| 0 | 5:38 | 5:42 | 6:55 | 955 | 1134 |
| 12 | 3:26 | 3:50 | 6:41 | 1048 | 1879 |

Example 3

Traditional cement slurry comprising 100% bwc Glass G Cement; 0.16 gps HR-6L; 0.5% bwc Halad®-344, 15% w/w NaCl; 0.03 gps D-AIR 300L™; and 46.34% water was tested for its rheological properties using a rheometer. The rheology of the traditional cement slurry was evaluated under the following conditions: (1) after conditioning for one hour at 80° F., (2) after conditioning for one hour at 160° F., and (3) after conditioning the slurry at 160° F. for one hour with contamination of about 3% weight-of-water 1:1 mole ratio of MgCl$_2$,6H$_2$O:KCl salt. Upon contamination, the traditional cement slurry immediately gelled, such that it would not be sufficiently fluid to use in a cementing operation. The rheometer data is provided in Table 8.

TABLE 8

| RPM | Conditioning at 80° F. | Conditioning at 160° F. | Conditioning at 160° F. with 3% 1:1 mole ratio of MgCl$_2$, 6H$_2$O:KCl salt (% weight-of-water) |
|---|---|---|---|
| 3 | 4 | 35 | Completely Gelled |
| 6 | 5 | 45 | |
| 30 | 11 | 96 | |
| 60 | 17 | 120 | |
| 100 | 24 | 143 | |
| 200 | 44 | 159 | |
| 300 | 62 | 185 | |

Therefore, the embodiments described herein are well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the embodiments described herein. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The invention claimed is:

1. A salt-tolerant cement slurry comprising:
   a base fluid;
   a cementitious material;
   a pozzolanic material;
   a salt-tolerant fluid loss additive comprising an amphoteric copolymer;
   a salt additive;
   an elastomer; and
   optionally a weight additive, a fluid loss intensifier, a strengthening agent, a dispersant, or any combination thereof;
   wherein the cementitious material is present in a range of about 5% to about 60% w/w of all components of the salt-tolerant cement slurry except the base fluid.

2. The salt-tolerant cement slurry of claim 1, wherein the cementitious material is a hydraulic cement.

3. The salt-tolerant cement slurry of claim 1, wherein the pozzolanic material is selected from the group consisting of silica fume; metakaolin; fly ash; diatomaceous earth; calcined diatomite; uncalcined diatomite; calcined fullers earth; pozzolanic clay; calcined volcanic ash; uncalcined volcanic ash; bagasse ash; pumice; pumicite; rice hull ash; natural zeolite; synthetic zeolite; slag; vitreous calcium aluminosilicate; and any combination thereof.

4. The salt-tolerant cement slurry of claim 1, wherein salt tolerant cement slurry has a yield point in the range of about 5 to about 200 lb/100 ft2 and a plastic viscosity in the range of about 120 to about 500 cP.

5. The salt-tolerant cement slurry of claim 1, wherein the pozzolanic material is present in a range of about 0.001% to about 60% w/w of all components of the salt-tolerant cement slurry except the base fluid.

6. The salt-tolerant cement slurry of claim 1, wherein the salt-tolerant fluid loss additive is present in a range of about 0.001% to about 3% w/w of all components of the salt-tolerant cement slurry except the base fluid.

7. The salt-tolerant cement slurry of claim 1, wherein the salt additive is selected from the group consisting of sodium chloride, potassium chloride, and any combination thereof.

8. The salt-tolerant cement slurry of claim 1, wherein the salt additive is present in the range of about 15% to about 40% w/w of all components of the salt-tolerant cement slurry except the base fluid.

9. The salt-tolerant cement slurry of claim 1, wherein the elastomer is selected from the group consisting of polypropylene; polyethylene; styrene divinyl benzene; polyisoprene; polybutadiene; polyisobutylene; polyurethane; a styrene-butadiene random copolymer; a styrene-butadiene block copolymer; acrylonitrile butadiene; acrylonitrile-styrene-butadiene; and any combination thereof.

10. The salt-tolerant cement slurry of claim 1, wherein the elastomer is present in a range of about 0.001% to about 20% w/w of all components of the salt-tolerant cement slurry except the base fluid.

11. The salt-tolerant cement slurry of claim 1, wherein the weight additive is selected from the group consisting of hausmannite ore; barite, hermatite; calcium carbonate; siderite; ilmenite; and any combination thereof.

12. The salt-tolerant cement slurry of claim 1, wherein the weight additive is present in a range of about 0.001% to about 30% w/w of all components of the salt-tolerant cement slurry except the base fluid.

13. The salt-tolerant cement slurry of claim 1, wherein the fluid loss intensifier is selected from the group consisting of 2-acrylamido-2-methylpropane sulfonic acid; N,N dimethyl acrylamide; acrylamide terpolymer; a copolymer thereof; any derivatives thereof; and any combination thereof.

14. The salt-tolerant cement slurry of claim 1, wherein the fluid loss intensifier is present in a range of about 0.001% to about 2% w/w of all components of the salt-tolerant cement slurry except the base fluid.

15. The salt-tolerant cement slurry of claim 1, wherein the strengthening agent is selected from the group consisting of silica flour; silica fume; and any combination thereof.

16. The salt-tolerant cement slurry of claim 1, wherein the strengthening agent is present in a range of about 0.001% to about 40% w/w of all components of the salt-tolerant cement slurry except the base fluid.

17. The salt-tolerant cement slurry of claim 1, wherein the dispersant is selected from the group consisting of sulfonated styrene maleic anhydride copolymer, sulfonated vinyltoluene maleic anhydride copolymer, sodium naphthalene sulfonate condensed with formaldehyde, sulfonated acetone condensed with formaldehyde, lignosulfonates and interpolymers of acrylic acid, allyloxybenzene sulfonate, allyl sulfonate and non-ionic monomers, and any combination thereof.

18. The salt-tolerant cement slurry of claim 1, wherein the dispersant is present in a range of about 0.001% to about 4% w/w of all components of the salt-tolerant cement slurry except the base fluid.

* * * * *